March 1, 1960 R. A. SANDBERG 2,926,421
METHOD OF BRAZING
Filed Dec. 3, 1953
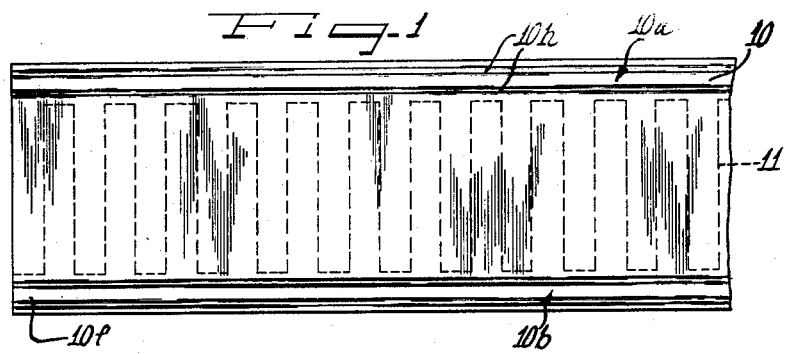
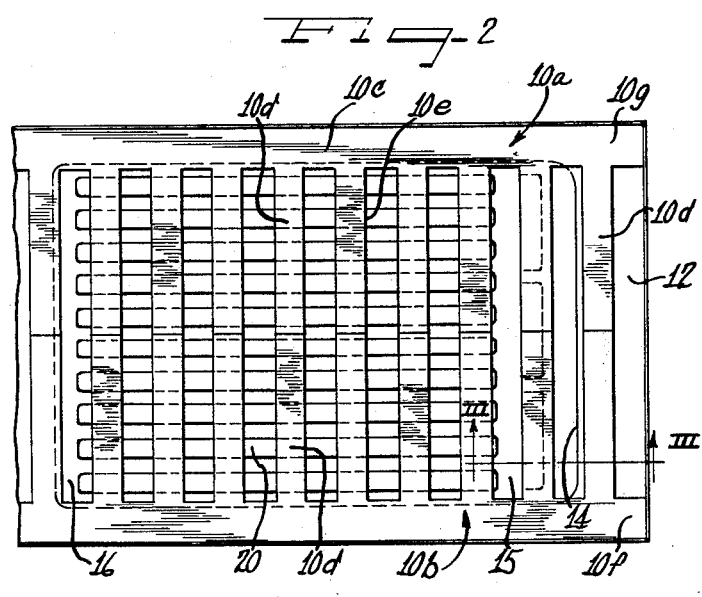
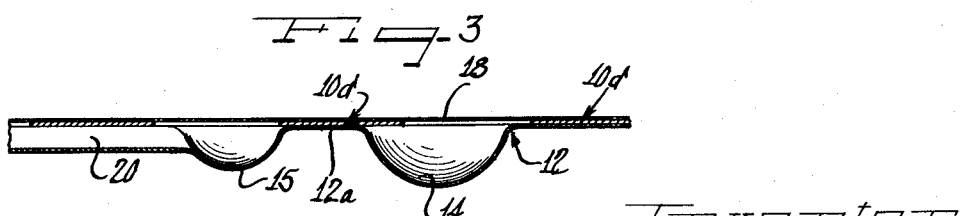
Inventor
Ray A. Sandberg

United States Patent Office

2,926,421
Patented Mar. 1, 1960

2,926,421

METHOD OF BRAZING

Ray A. Sandberg, Waukegan, Ill., assignor to Houdaille Industries, Inc., a corporation of Michigan Application December 3, 1953, Serial No. 395,894

1 Claim. (Cl. 29—475)

This invention relates to a method of brazing and to a brazing strip especially adapted for use in the method.

It is an object of the present invention to provide a novel method for brazing sheet metal surfaces.

It is a further object of the present invention to provide a novel method for utilizing commercial brazing stock in brazing sheet metal articles, which method results in a substantial reduction in the cost of brazing stock per article.

It is another object of the present invention to provide a brazing method providing a uniform distribution of brazing material in spite of any overheated areas which may be present during the brazing operation.

It is still another object of the present invention to provide a novel brazing strip for use in brazing sheet metal articles.

It is a more specific object of the present invention to provide a brazing strip especially adapted for use in brazing refrigerator evaporator inner and outer shells.

Other objects, features and advantages of the invention will be readily apparent from the following detailed description of one embodiment thereof taken in conjunction with the accompanying sheet of drawings, in which:

Figure 1 is a diagrammatic plan view indicating the manner of forming brazing strips according to the present invention from conventional brazing stock;

Figure 2 is a plan view illustrating the manner in which the brazing strips cooperate with the configuration of the outer shell of a refrigerator evaporator, only a portion of the outer shell being illustrated; and Figure 3 is a longitudinal sectional view taken substantially along the line III—III of Figure 2 and indicating the disposition of the brazing strip relative to the embossments in the outer shell, the thickness of the brazing strip being exaggerated for clarity.

The present invention is based on the discovery that a substantial savings in material costs can be achieved while at the same time producing a superior brazed article by severing the conventional brazing stock into a plurality of interdigitated brazing strips.

Conventional brazing practice for refrigerator evaporators involves the use of strips or sheets of copper of about 0.0031 inch thickness. This thickness is dictated by the consideration that excessive penalties in terms of cost penalties per pound are placed upon the purchase of thinner stock. However, it has been found that a thinner stock would meet brazing requirements. One purpose of the present invention is to utilize the economically produced relatively thick gauge while using an amount of brazing material for a given article equivalent to that which would be used if a thinner gauge stock were employed.

According to one embodiment of the present invention, for brazing a medium size evaporator of 13⅛ inch width and 40⅛ inch length, only one piece of copper 0.0031 inch thick, 7¾ inches wide and 40 inches in length is required. This represents 0.30 pound of copper at approximately 50 cents per pound or a material cost of 15 cents per unit. Conventional practice for the same evaporator utilizes two pieces of copper 0.0031 inch thick by 6½ inches wide by 40 inches in length. This amounts to 0.52 pound of copper or at the assumed figure of 50 cents per pound, 26 cents per unit. Thus, a 42.4% saving in purchased material is achieved in this instance.

In Figure 1, the reference numeral 10 designates a strip of copper of 0.0031 inch thickness and 7¾ inch width, such as would be utilized in the above example. As indicated by the severance line 11, the strip is cut into two interdigitated strip portions 10a and 10b. The portions 10a and 10b are separated and disposed relative to the outer shell of the evaporator, as indicated in Figure 2. Each brazing strip has an elongated continuous base portion 10c with laterally extending fingers 10d separated by slots or gaps 10e. As indicated in Figure 2, the base portions 10c extend along the flat planar longitudinal margins of the evaporator outer shell 12, and it will be understood that when the inner shell 18 is placed in assembly with the outer shell 12, the base portions 10c will be sandwiched between the respective opposed longitudinal margins of the inner and outer shells. It may be noted that the end portion 10f of the strip 10b, Figure 1, is placed at the end of the evaporator at which the end stub 10g of strip 10a, Figure 2, is placed by turning the strip 10b end for end. Corresponding finger portions 10d of each strip are preferably aligned as indicated and the strips are preferably so dimensioned that the fingers are displaced from the various transverse embossments such as 14, 15 and 16 indicated in Figures 2 and 3. The fingers are then sandwiched between the inner shell 18 and the various planar portions 12a of the outer shell 12 as indicated in Figure 3. It will be observed that the fingers extend across the longitudinal embossments 20 of the portion of the evaporator illustrated.

It will be observed from Figure 1 that the strip of copper 10 is preferably provided with a pair of longitudinal stiffening beads 10h along each side edge thereof for ease in handling and to avoid any flimsiness in progressing the copper strip through the die which cuts the strip into two pieces. The showing of these beads is omitted in Figure 2. If the beads are provided, it will be readily understood that the steel evaporator shells are not held apart by the beads during brazing since the beads disappear from the copper long before the melting point is reached due to a weighted rack resting on the shells, such a rack being illustrated in my application entitled "Method of and Apparatus for Brazing," filed of even date herewith.

It has been found that the brazing strip portions provide brazing material over the entire area of the article when heated, just as when a solid brazing strip is used. It has further been found that the gaps between the fingers act as a barrier to unduly free flow of copper toward localized overheated areas such as may occur due to the spacing between the shells at the embossments. Flooding of areas which have been wetted with molten copper due to localized overheating is thus avoided and a more uniform distribution of copper on the finished product is obtained than with the conventional method. The spacing between fingers 10d is selected so that during the brazing operation, the copper will flow together and completely cover the exposed surface portion of the shells between the fingers. If the spacing between fingers is 1 inch, it will be noted that copper need only flow a half inch from each adjacent finger to cover the gap therebetween. It will thus be apparent that the method of the present invention involves, broadly, the distributing of brazing material over the surface to be brazed to leave unexposed surface portions of extent to be covered by flow of brazing material during the brazing operation, whereby the initially exposed surface portions of the surface to be brazed act as barriers to unduly free flow of brazing material toward any localized overheated spots which may be present.

Further, according to the present invention, conventional relatively thick brazing stock is formed into interdigitated portions, which are separated and distributed over the area of the parts to be brazed, the thick brazing stock in molten condition covering the parts with a layer equivalent to that obtainable from a solid relatively thin stock of area equal to the area to be brazed.

It will be further understood that the brazing strips comprise spaced transverse portions 10d having gaps 10e therebetween which are spaced along the area to be brazed, so as to flow together and cover the entire area during the brazing operation, the spacing preventing flooding of overheated portions of the parts being brazed.

It will be understood that modifications and variations may be effected without departing from the scope of the novel concepts of the present invention.

I claim as my invention:

The method of brazing together two metal sheets wherein one of the sheets has transverse embossments at spaced intervals along its length, which comprises: forming an elongated strip of copper brazing material of about .003 inch thickness into two laterally adjacent strip portions by severing the strip along a coextensive severance line intermediate and spaced from the edges of said strip, said severance line defining a series of fingers integral alternately with one of said strip portions, each extending transversely to said edges, and each defining a prospective gap between two fingers of the other strip portion, the gaps of each of said portions being spaced from each other to register with the transverse embossments; separating said first and second strip portions from each other; distributing said strip portions on said one of said sheets over the area to be brazed with the gaps registering with the transverse embossments, with said edges aligned with opposite margins of the sheet, and with the fingers of one of said portions aligned with and directed toward the fingers of the other of said portions; superposing the other of said sheets onto said strip portions; and heating the strip portions to flow brazing material into the gaps between said fingers to cover the area to be brazed.

References Cited in the file of this patent

UNITED STATES PATENTS

| | | |
|---|---|---|
| 428,575 | Stanley | May 20, 1890 |
| 432,691 | Burdon | July 22, 1890 |
| 509,770 | Scott | Nov. 28, 1893 |
| 1,754,466 | Hosking | Apr. 15, 1930 |
| 2,023,354 | Cope | Dec. 3, 1935 |
| 2,085,313 | Guthrie | June 29, 1937 |
| 2,158,383 | Saunders | May 16, 1939 |
| 2,232,176 | Guthrie | Feb. 18, 1941 |
| 2,248,801 | Bernt | July 8, 1941 |
| 2,346,555 | Cobb | Apr. 11, 1944 |
| 2,359,926 | McCullough et al. | Oct. 10, 1944 |
| 2,650,957 | Cohen | Sept. 1, 1953 |